United States Patent Office 2,855,209
Patented Oct. 7, 1958

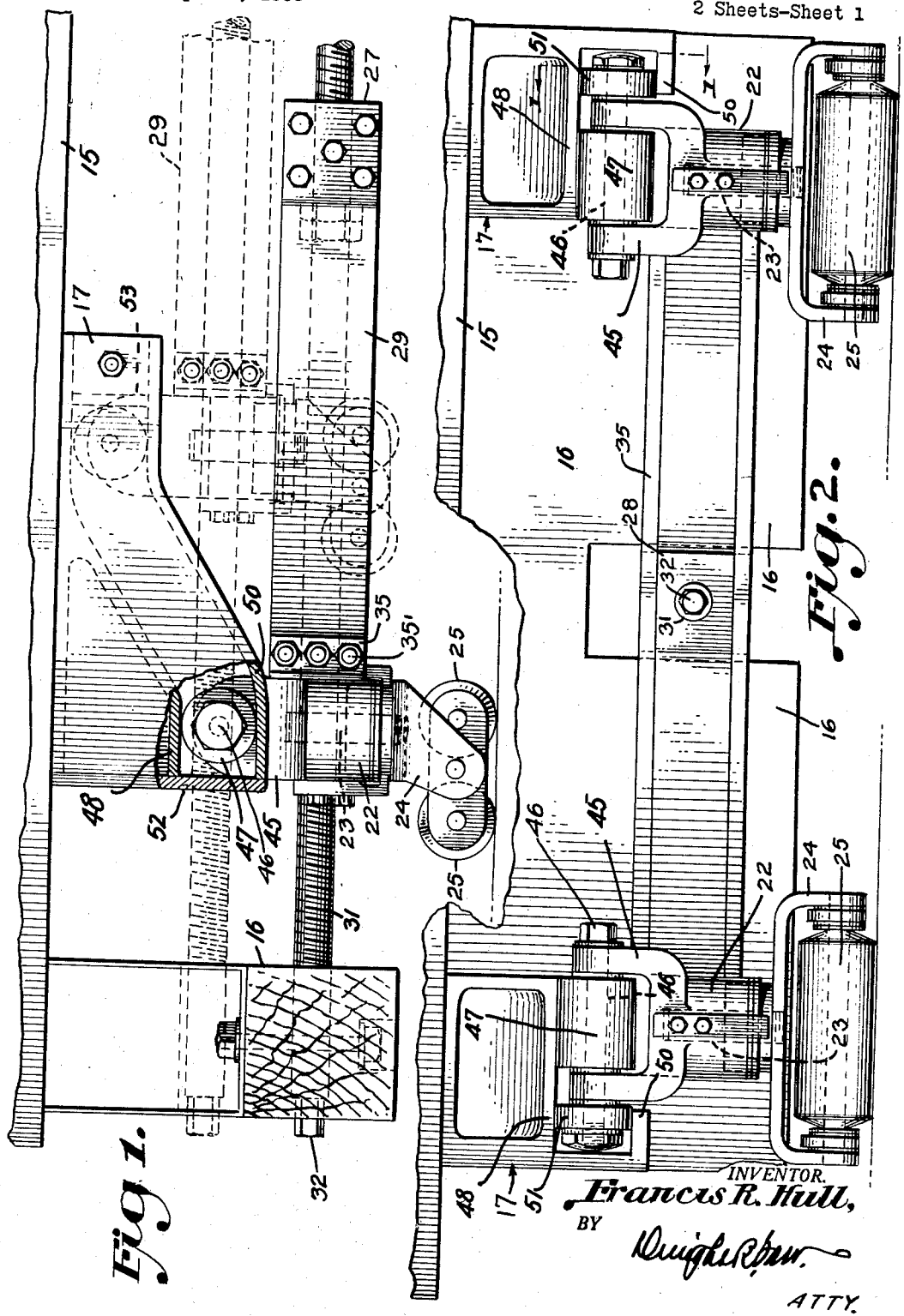

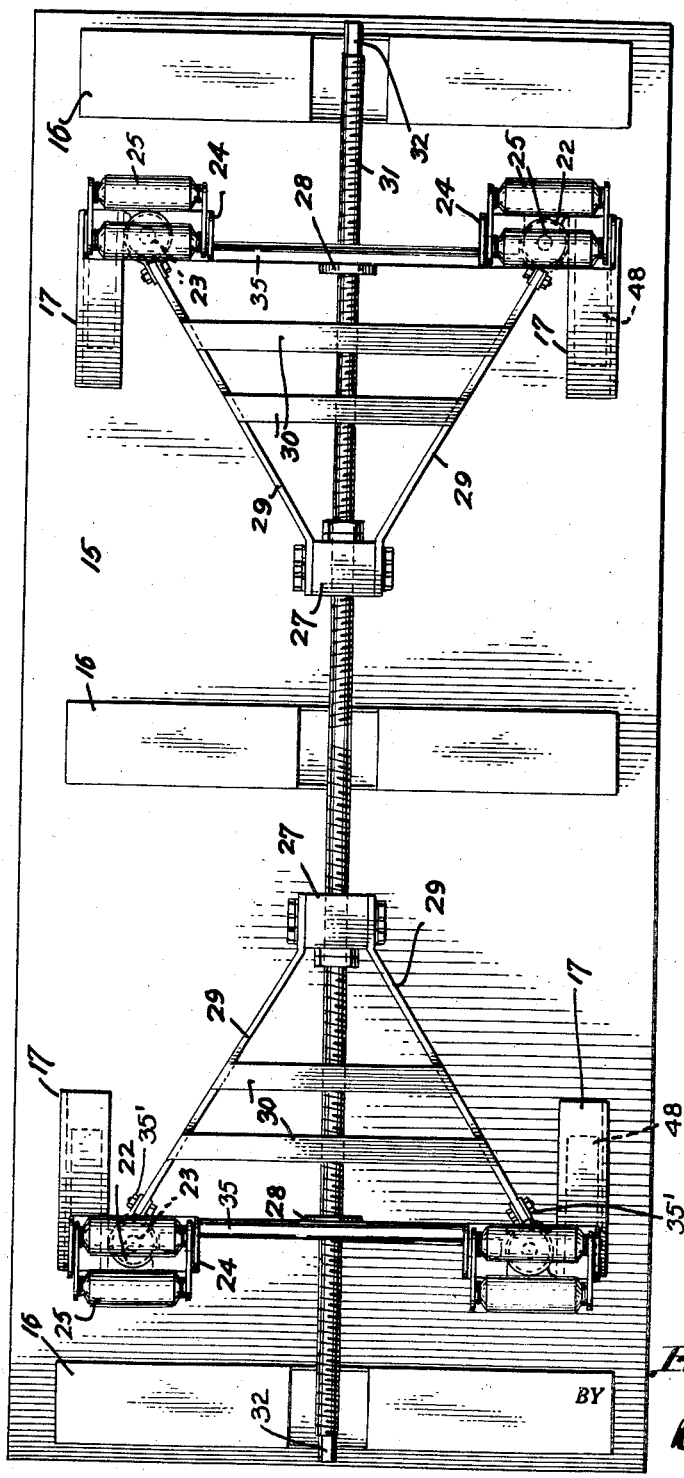

2,855,209

RETRACTIBLE CARRIAGE MOUNTING

Francis R. Hull, Macungie, Pa.

Application September 8, 1955, Serial No. 533,046

2 Claims. (Cl. 280—44)

This invention is a retractible carriage mounting, the primary object of which is to provide a carriage supported upon rollers, casters or the like, for use in supporting a shipping container to be stored in the shipping van, car or ship, and which is possessed of mechanism capable of being operated to permit easy and accurate maneuverability of the container and also to provide means whereby the supporting rollers for the carriage may be retracted in order that the shipping container and its supporting carriage may rest firmly upon its base when stored.

In the shipping of merchandise, either over land or by sea, it is proposed to enclose the merchandise in a proper container to be placed within the transport carrying structure in such manner as to economize space, to enable the container to be readily and easily handled for stowage aboard the carrier, and to enable the loaded container to be easily and quickly manipulated to a proper position within the carrier preparatory to its being permanently stowed properly positioned therein.

The main purpose of the present invention is to provide a carriage for such use which is equipped with supporting rollers, wheels or casters in order to enable the carriage to be easily and quickly maneuvered for loading or stowage purposes, after which the supporting rollers may be readily retracted or moved from supporting position to enable the container to rest upon its bottom in the selected position.

A further object of the invention is to provide a mounting for the carriage equipped with the usual supporting sills, and wherein the transporting rolling structure may be moved easily and quickly to a retracted position above the plane of the supporting surfaces of the sills when desired, and may equally as easily and readily be extended to such position as to support the carriage and its load.

A further and particular object of the invention is to provide details of construction in the carriage mounting and means for projecting or retracting the same which is a variation from the structure generally illustrated and described in my copending application Serial No. 514,543, filed June 10, 1955.

With the foregoing objects in view, together with others which will appear as the description proceeds, the invention resides in the novel construction, combination and arrangement of parts, all as will be described more fully hereinafter, illustrated in the drawings, and particularly pointed out in the claims.

In the drawings:

Fig. 1 is a side elevation, parts in section, of one end of a supporting vehicle equipped with retractible supporting mechanism constructed in accordance with the invention, Fig. 2 is an end view of the vehicle and supporting mechanism, and Fig. 3 is a bottom plan view of the vehicle equipped with the improved retractible carriage mounting.

Referring now to the drawings, in Fig. 1 the reference character 15 indicates the bottom or supporting platform of the carriage with which the retractible landing gear is associated. In the present instance, this is referred to as a carriage, but it will be understood that the mechanism may be effectively used in connection with a box-like container for the accommodation of goods or merchandise apart from purely a carriage structure. This carriage or vehicle frame is provided upon its underside with depending supporting sills 16 arranged in spaced parallelism at the ends and in the middle of said frame and disposed transversely thereof. These sills are of such depth as to support the carriage bottom 15 a proper or substantial distance above a supporting surface when resting thereon.

Secured to the bottom of the platform 15 in spaced parallelism and depending therefrom near each end of the vehicle frame are a pair of trackway castings represented generally at 17. These castings will be made of suitable metal of sufficient strength to withstand the pressures and weights to which they will be subjected in use, and each has a longitudinally disposed overhead bearing surface 48 and a lower inturned track 50 in substantial parallelism with one another. The bearing surface and track extend inwardly from the forward end of the casting in substantial horizontal position for a short distance, then incline in an upward direction as shown in Fig. 1, whereupon they again assume horizontal position. It will be understood that these castings are arranged in pairs at each end of the bottom or platform 15, the castings of each pair being in lateral parallelism as shown in Fig. 3.

Arranged transversely of the vehicle frame at each end thereof is a roller supported frame which includes transverse spreader bars 35 which are connected as at 35' to the outer ends of diverging bars or arms 29 whose inner ends are secured to a traveller 27 which threadedly receives the adjacent end of a threaded shaft 31 disposed in the longitudinal center of the body 15 and below the latter. The shaft also is threadedly engaged in travellers 28 secured midway the ends of the spreader bars 35, and it will be noted, particularly with reference to Fig. 3, that the threads at one end of the shaft are disposed at an inclination opposite to those at the opposite end. The frames are stabilized by lateral struts 30.

The outer ends of arms 29 are secured to caster housings 22 which rotatably receive upstanding spindles 23 of caster yokes 24, in which are rotatably mounted spaced supporting rollers 25 to rest upon a floor or other support. Each housing has spaced upstanding yoke arms 45 in which is rotatably mounted a laterally disposed spindle 46 having a roller 47 mounted thereon in supporting engagement at its upper side with the overhead track 48. The outer end of each spindle carries a secondary or bearing roller 51 which rests in rolling engagement upon the inturned track 50. From this description, it is apparent that as the floating shaft 31 is rotated by engagement of a proper tool with the squared end 32 thereof, the retractible supporting frames are moved longitudinally of the vehicle in opposite directions. When the shaft is rotated in such direction as to draw these frames toward the center of the vehicle, the rollers 47 will ride upon the overhead trackway 48 up the inclined surface thereof to the upper horizontal disposed portion thereof as shown by dotted lines in Fig. 1 of the drawings, while at the same time the bearing rollers 51 will travel upon their inturned tracks 50. In so doing, the vehicle body moves in a downward direction until the supporting rollers 25 clear the supporting surface or ground, whereupon the sills 16 engage the supporting surface and thus bear the entire weight of the vehicle and its contents. When the shaft 31 is rotated in the opposite direction, the rollers 47 and 51 and the elements carried thereby move down the inclined trackway 48 until the supporting rollers 25 engage the supporting surface, after which continued movement of the shaft causes the body to be elevated a sufficient distance to clear the sills 16 and thus subject the entire weight of the vehicle to the supporting rollers. When in this position, the rollers 47—51 will have reached the lower horizontal surfaces of their respective tracks. The secondary rollers 51, in addition to assisting in supporting the weight of the carriage, roll upon the track 50 to prevent the caster structure from dropping from the casting 49. The forward ends of the castings 49 are provided with closure plates 52 to prevent the rollers passing beyond their respective supporting surfaces, while the rear ends of these castings are closed by plates indicated at 53 to prevent the rollers 47 from passing from the inner ends of the supporting surfaces of the castings.

From the foregoing, it is apparent that I have provided means for effectively projecting or retracting the supporting caster structures as occasion may demand, with ease and facility as well as with the expenditure of comparatively little manual effort. The various parts of the structure are so formed and assembled as to afford a rigid support for carriages designed for the accommodation of relatively heavy loads. Notwithstanding extreme weights to which the carriage may be subjected, the apparatus may be readily manipulated manually to bring about either projected or retracted positions of the supporting casters.

I claim:

1. In a retractible carriage mounting, a vehicle body, a pair of inclined tracks mounted on the underside of said body near each end thereof and spaced from each other laterally of said vehicle body, each track comprising a bearing surface, an inturned rail below each of said tracks projecting inwardly toward the longitudinal center of the vehicle body and conforming to the inclination of said tracks, the inclination of each track pair and their cooperating rails being in an upward direction inwardly of the body ends, a floating threaded shaft disposed longitudinally beneath said body substantially midway between the tracks of each pair, the threads of said shaft at one end being oppositely inclined to the threads at the opposite end thereof, a frame beneath each end of said body, a traveller for each frame engaged with the threads of the adjacent shaft end, a caster housing at each side of each of said frames, a roller projecting laterally from each of said housings resting upon the adjacent rail, a bearing roller rotatably mounted on each of said housings and engaged with the adjacent track, and caster wheels carried by said housings and depending therefrom.

2. In a retractible carriage mounting, a vehicle body, a pair of inclined track castings mounted on the underside of said body near each end thereof and spaced from each other laterally of said vehicle body and in parallelism, the inclination of each track pair being in an upward direction inwardly of the body ends, an inwardly turned track integral with each casting at the outer side thereof spaced below the surface of said track, said tracks conforming to the inclination of said inclined tracks, the inclination of each track surface and its associate track being in an upward direction inwardly of the body ends, a floating threaded shaft disposed longitudinally beneath said body substantially midway between the tracks of each pair, the threads of said shaft at one end being oppositely inclined to the threads at the opposite end thereof, a frame beneath each end of said body, a traveller for each frame engaged with the threads of the adjacent shaft end, a caster housing at each side of said frame disposed beneath said track castings, a yoke rising from each of said housings, a roller rotatably mounted in each of said yokes and resting upon said tracks, a second roller coaxial with the first roller and resting upon said inturned tracks as well as upon said trackways, and caster wheels carried by said housings and depending therefrom.

References Cited in the file of this patent

UNITED STATES PATENTS

| | | |
|---|---|---|
| 872,742 | Oesterle | Dec. 3, 1907 |
| 1,154,370 | Burke | Sept. 21, 1915 |
| 1,857,468 | McGinness | May 10, 1932 |
| 2,638,354 | Larson | May 12, 1953 |